Dec. 6, 1960 H. FARBER 2,963,107
DOOR OPERATED VEHICLE BRAKE MECHANISM
Filed Dec. 5, 1958
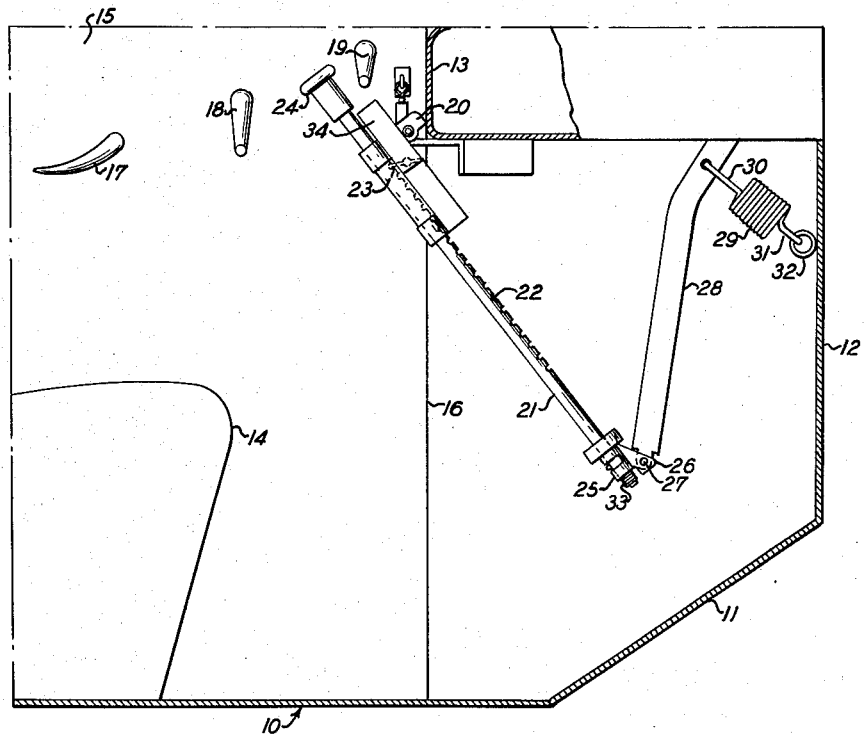
Fig. 1
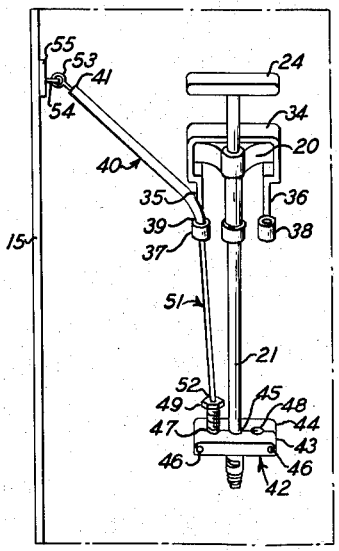
Fig. 2
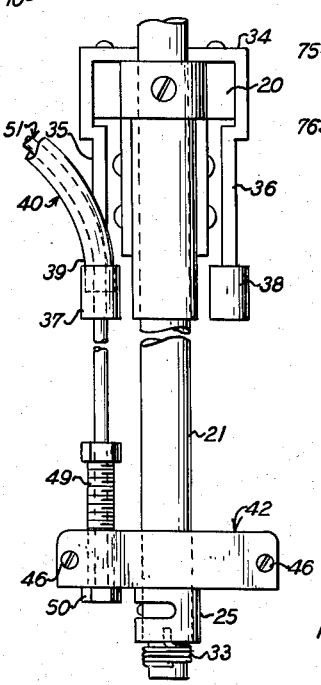
Fig. 3
Fig. 4
INVENTOR
HENRY FARBER
BY Jacobi & Jacobi
ATTORNEYS United States Patent Office 2,963,107
Patented Dec. 6, 1960

2,963,107

DOOR OPERATED VEHICLE BRAKE MECHANISM

Henry Farber, 69—28 226th St., Bayside, N.Y.

Filed Dec. 5, 1958, Ser. No. 778,361

6 Claims. (Cl. 180—82)

This invention relates to automotive vehicles and more particularly to a door operated vehicle brake mechanism which may be installed in a vehicle as original equipment or as an accessory and which serves to provide for automatic setting of the brakes upon opening of one or more doors of the vehicle.

As is well known, all automotive vehicles are at present provided with what is commonly known as a parking brake which is usually actuated by a rod mounted below the instrument panel of the vehicle in a position convenient to the operator or by a foot operated pedal disposed below the instrument panel. Means is commonly provided for releasably locking the brake actuating mechanism in applied position with the result that the brake must be released by the operator prior to operation of the vehicle.

Frequently an operator will leave a vehicle without applying the parking brake and while in many instances the gearshift lever is placed in reverse in order to hold the vehicle in position, nevertheless this gearshift lever may accidentally slip out resulting in movement of the vehicle or as is the case with many present day automatic transmissions there is no means provided whereby the vehicle may be locked against movement except by use of the parking brake. Certain automobiles equipped with automatic transmissions are provided with a parking lock which is intended to prevent movement of the vehicle but these locks frequently fail and in the event the vehicle is parked on an incline, movement of the same follows with sometimes disastrous results.

It therefore appears that the provision of mechanism for automatically applying the parking brake of a vehicle without any thought or specific action on the part of the operator represents a step forward in the art and serves to fill a long felt need.

It is accordingly an object of the invention to provide a door operated vehicle brake mechanism which may be conveniently applied to a vehicle either as original equipment or as an accessory and which will operate to automatically apply the parking brake upon opening of one or more doors of the vehicle.

A further object of the invention is the provision of a door operated vehicle brake mechanism which may be conveniently and economically manufactured and installed as accessory equipment on a vehicle and in which the same may be connected only to the door on the driver's side of the vehicle or may also be connected to such door and to the opposite front door of the vehicle whereby upon opening of either door, the parking brake will be automatically applied.

A still further object of the invention is the provision of a door operated vehicle brake mechanism which may be furnished in kit form and installed in an existing vehicle without modification of the existing structure and without the necessity of utilizing special tools or requiring the services of a highly skilled person.

Another object of the invention is the provision of a door operated vehicle brake mechanism which may be conveniently installed in existing motor vehicles and which will in no way interfere with the normal conventional operation of the parking brake.

A further object of the invention is the provision of a door operated vehicle brake mechanism which may be conveniently installed in vehicles utilizing a foot pedal for actuating the parking brake and in which such foot pedal is operated by opening the door on the driver's side of the vehicle.

Further objects and advantages of the invention will be apparent from the following description taken in conjunction with the accompanying drawing wherein:

Fig. 1 is a fragmentary side elevational view with parts in section for greater clarity and showing a conventional parking brake operating mechanism together with the door operated mechanism of this invention installed therein;

Fig. 2 a rear elevational view of the brake operating installation shown in Fig. 1;

Fig. 3 a view in elevation to an enlarged scale showing the manner in which the door operated brake mechanism of this invention is installed on the conventional parking brake operating mechanism; and Fig. 4 a fragmentary view similar to Fig. 1 and with parts in section for greater clarity and showing a door operated brake mechanism for use in vehicles having a parking brake operated by a foot pedal.

With continued reference to the drawing, there is shown in Fig. 1 a portion of a vehicle body 10 there being also shown a floorboard 11, a firewall 12 and an instrument panel or the equivalent thereof 13. Also shown in Fig. 1 is the front seat 14 of the vehicle as well as a door 15 on the driver's or operator's side of the vehicle, the door 15 being hingedly mounted along a line 16 for opening and closing swinging movement, the door 15 being provided with the usual latch operating handle 17 and window operating crank members 18 and 19.

Pivotally mounted on the instrument panel 13 is a bracket 20 which serves to slidably receive a brake actuating rod 21 and it is to be noted that such rod 21 is provided with axially spaced ratchet teeth 22 and that the bracket 20 is provided with a pivotally mounted pawl 23 for engaging the teeth 22 to releasably hold the rod 21 in position to hold the parking brakes of the vehicle applied. The rod 21 may be provided with a hand engaging handle 24 to permit convenient manipulation of the same. Rotatably mounted on the lower end of the rod 21 but fixed against axial movement with respect thereto is a collar 25 having an ear 26 projecting therefrom which is connected by means of a pivot pin 27 to a brake actuating lever 28 which in turn is pivotally mounted at an appropriate location on the vehicle body 10. A return spring 29 may have one end 30 connected to the brake actuating lever 28 and the opposite end 31 connected to an eye 32 or other suitable means attached to the firewall 12. A torsion spring 33 is received on the lower end of the brake actuating rod 21 and one end of the spring 33 is fixed to the rod 21 and the opposite end to the collar 25. The spring 33 is so oriented as to normally maintain the rod 21 in a position for the teeth 22 to engage the pawl 23 whereby upon movement of the rod 21 upwardly as shown in Fig. 1, the pawl 23 will operate to retain the rod 21 in uppermost position and with the parking brakes of the vehicle applied. When it is desired to release the parking brake, it is only necessary for the operator to grasp the handle 24 and turn the rod 21 against the action of the spring 33 which will result in disengaging the pawl 23 from the teeth 22 and permit movement of the rod 21 downwardly to original position with the vehicle parking brakes released. Upon release of the handle 24 by the operator the spring 33 will automatically return the rod 21 to original position so that upon further upward movement thereof, the teeth 22 will be engaged by the pawl 23.

With particular reference to Figs. 2 and 3 the door operated vehicle brake mechanism of this invention may well comprise a bracket 34 secured to the rod mounting bracket 20 on the instrument panel 13 and the bracket 34 may be provided with spaced downwardly extending arms 35 and 36 terminating in sockets 37 and 38, respectively. As shown in Fig. 2 and 3, one end 39 of a flexible housing 40 may be secured to the socket 37 of the bracket 34 and the opposite end 41 of the housing 40 terminates adjacent the door 15 of the vehicle. A cross bar 42 consisting of two parallel members 43 and 44 may be provided with a central aperture 45 for receiving the brake actuating rod 21 and the cross bar 42 may be clamped on the rod 21 by screw threaded fastening means or the like 46 securing the two members 43 and 44 comprising the cross bar 42 together and it is to be noted that the cross bar 42 may be positioned at any desired location on the brake actuating rod 21.

The cross bar 42 may also be provided with threaded apertures 47 and 48 and as shown in Figs. 2 and 3 a fitting 49 is threadedly received in the aperture 47 and the fitting 49 may be locked in adjusted position by a lock nut or other suitable means 50 or if desired, the lock nut 50 may be dispensed with. A flexible cable 51 is slidably received in the housing 40 and extends therethrough and the lower end 52 of the cable 51 is secured to the fitting 49 while the upper end 53 of the cable 51 is secured to the door 15 of the vehicle by any suitable means such as an eye 54 mounted on a plate 55 attached to the door 15.

In the operation of the above described form of the invention, it is assumed that the brake actuating rod 21 is in the position shown in Figs. 1 and 2 and upon opening of the door 15 of the vehicle a pull will be exerted on the cable 51 which will operate through the cross bar 42 to move the actuating rod 21 upwardly in the bracket 20 and upon reaching the applied position of the brakes the pawl 23 in engagement with the teeth 22 will retain the rod 21 in this position. In this manner the parking brakes of the vehicle are applied upon opening of the door 15 and when the door is closed the flexible housing 40 and cable 51 merely move transversely to accommodate the slack provided therein by closing of the door and such slack will be further taken up upon release of the actuating rod 21 to release the parking brake of the vehicle. However the parking brake will remain applied until such time as the operator chooses to release the same. In this manner the parking brakes are automatically applied upon opening of the door of the vehicle and obviously this requires no thought or specific operation on the part of the driver. In this manner, many accidents due to runaway vehicles will be prevented. While the invention has been above described as connected to the door of the vehicle on the driver's side, if desired the brake mechanism may also be connected to the door on the opposite side of the driver's compartment and for this reason the socket 38 on the bracket 34 serves to accommodate a second flexible housing through which a cable extends to be connected to the door on the opposite side of the vehicle and to a fitting threadedly received in the aperture 48 in the cross bar 42. This additional structure for operation from either front door of the vehicle is not shown in the drawing but the structure and operation thereof will be obvious since the same is substantially identical except as to length to the structure described in connection with the door on the driver's side of the vehicle.

As is well known, some types of present day cars are provided with parking brakes operated by a foot pedal rather than by a hand operated rod or lever and there is shown in Fig. 4 a modified form of the invention for use with this type of parking brake mechanism. As shown in Fig. 4, there may be provided a parking brake operating pedal 56 having an arm 57 pivotally mounted on the vehicle at an appropriate location and a foot engaging portion 58 disposed in a position convenient to the driver. The pedal operating mechanism 56 is held in applied position by a locking means, not shown, but which is entirely conventional and there may be provided a return spring 59 having one end 60 connected to the lever arm 57 and the opposite end 61 connected to an eye 62 secured to the vehicle. A bracket 63 has one end 64 secured to the floorboards 65 of the vehicle by screw threaded or other suitable fastening means 66 and on the opposite end 67 of the bracket 63 there is pivotally mounted by a pin 68 a rocker arm 69. One end 70 of the rocker arm 69 is connected through a tension member 71 with the pedal 56 and the opposite end 72 of the rocker arm 69 is connected through a tension spring 73 with a cable 74 which in turn is connected to an eye 75 mounted on the door 76 on the driver's side of the vehicle. A return spring 77 has one end 78 connected to the end 72 of the rocker arm 69 and the opposite end 79 connected to the floorboard 65.

In operation, upon opening of the door 76, tension will be applied to the cable 74 which through the spring 73 will cause the rocker arm 69 to pivot about the pin 68 and through the tension member 71 to depress the pedal 56 thereby applying the parking brake of the vehicle. Any excess movement of the door 76 beyond the position at which the parking brake is fully applied will be compensated for by the tension spring 73. Upon release of the locking mechanism for the pedal 56, the return spring 77 will move the rocker arm 69 and cable 74 to original position.

It will accordingly be seen that by the above described invention, there has been provided a convenient, simple and economical mechanism for application to a vehicle as an accessory or as original equipment and which provides for automatic application of the parking brakes by opening the door on the driver's side of the vehicle or in certain instances, by opening either such door or the door on the opposite side of the vehicle and which will result in preventing movement of the vehicle inadvertently due to failure to apply the brake on the part of the driver or due to failure of transmission or other locking means intended to prevent movement of the vehicle. In this manner, many accidents resulting from inadvertent movement of vehicles in the absence of the driver may be prevented.

It will be obvious to those skilled in the art that various changes may be made in the invention without departing from the spirit and scope thereof and therefore the invention is not limited by that shown in the drawing and described in the specification, but only as indicated in the appended claims.

What is claimed is:

1. Door operated vehicle brake mechanism comprising a bracket mounted on the vehicle, a brake actuating rod slidably mounted in said bracket in a position convenient to the operator, automatic means for releasably locking said rod in brake applied position, a flexible elongated housing secured adjacent one end to said bracket and terminating at the opposite end adjacent the door of the vehicle, a cross bar adjustably secured on said rod, a threaded aperture in said cross bar, a fitting threadedly received in said aperture for adjustment longitudinally of said rod, means to lock said fitting in adjusted position and a flexible cable extending through said housing secured at one end to said fitting and at the opposite end to the door of the vehicle, whereby upon opening said door said cable will serve to move said rod to apply the brakes of the vehicle, said automatic means serving to lock said brakes in applied position until released by the operator.

2. Door operated vehicle brake mechanism as defined in claim 1 in which said bracket is provided with means for attaching a second housing and said cross bar is provided with a second threaded aperture for threadedly receiving a second fitting, whereby cables may be attached to each front door of the vehicle and said brakes applied by the opening of either door.

3. Door operated vehicle brake mechanism comprising a bracket mounted on the vehicle, a brake actuating rod slidably mounted in said bracket in a position convenient to the operator, automatic means for releasably locking said rod in brake applied position, a flexible elongated housing secured adjacent one end to said bracket and terminating at the opposite end adjacent the door of the vehicle, a cross bar adjustably secured on said rod, a threaded aperture in said cross bar, a fitting threadedly received in said aperture for adjustment longitudinally of said rod and a flexible cable extending through said housing secured at one end to said fitting and at the opposite end to the door of the vehicle, whereby upon opening said door said cable will serve to move said rod to apply the brakes of the vehicle, said automatic means serving to lock said brakes in applied position until released by the operator.

4. Door operated vehicle brake mechanism comprising a bracket mounted on the vehicle, a brake actuating rod slidably mounted in said bracket in a position convenient to the operator, automatic means for releasably locking said rod in brake applied position, a flexible elongated housing secured adjacent one end to said bracket and terminating at the opposite end adjacent the door of the vehicle, a cross bar adjustably secured on said rod, a fitting attached to said cross bar for adjustment longitudinally of said rod and a flexible cable extending through said housing secured at one end to said fitting and at the opposite end to the door of the vehicle, whereby upon opening said door said cable will serve to move said rod to apply the brakes of the vehicle, said automatic means serving to lock said brakes in applied position until released by the operator.

5. Door operated vehicle brake mechanism comprising a bracket mounted on the vehicle, a brake actuating rod slidably mounted in said bracket in a position convenient to the operator, automatic means for releasably locking said rod in brake applied position, a flexible elongated housing secured adjacent one end to said bracket and terminating at the opposite end adjacent the door of the vehicle, a cross bar adjustably secured on said rod, a fitting attached to said cross bar and a flexible cable extending through said housing secured at one end to said fitting and at the opposite end to the door of the vehicle, whereby upon opening said door said cable will serve to move said rod to apply the brakes of the vehicle, said automatic means serving to lock said brakes in applied position until released by the operator.

6. Door operated vehicle brake mechanism comprising a bracket mounted on the vehicle, a brake actuating rod slidably mounted in said bracket in a position convenient to the operator, automatic means for releasably locking said rod in brake applied position, a flexible elongated housing secured adjacent one end to said bracket and terminating at the opposite end adjacent the door of the vehicle and a flexible cable extending through said housing secured at one end to said rod and at the opposite end to the door of the vehicle, whereby upon opening said door said cable will serve to move said rod to apply the brakes of the vehicle, said automatic means serving to lock said brakes in applied position until released by the operator.

References Cited in the file of this patent
UNITED STATES PATENTS

| | | |
|---|---|---|
| 1,664,042 | McGinley | Mar. 27, 1928 |
| 1,718,258 | Schmidt | June 25, 1929 |
| 1,880,129 | Gattie | Sept. 27, 1932 |
| 2,254,419 | Castle | Sept. 2, 1941 |
| 2,734,590 | Hays | Feb. 14, 1956 |
| 2,778,455 | Roach | Jan. 22, 1957 |
| 2,866,511 | Niederoest | Dec. 30, 1958 |